US00RE38014E

(19) United States
(12) Reissued Patent
Bieberstein

(10) Patent Number: US RE38,014 E
(45) Date of Reissued Patent: Mar. 4, 2003

(54) MINIATURE FLASHLIGHT

(75) Inventor: Lee K. Bieberstein, Newport Beach, CA (US)

(73) Assignee: Mag Instrument, Inc., Ontario (CA)

(21) Appl. No.: 08/433,986

(22) Filed: May 4, 1995

Related U.S. Patent Documents

Reissue of:
(64) Patent No.: 4,733,337
Issued: Mar. 22, 1988
Appl. No.: 06/896,940
Filed: Aug. 15, 1986

(63) Continuation of application No. 07/498,824, filed on Mar. 22, 1990, now abandoned.

(51) Int. Cl.[7] ..... F21L 7/00
(52) U.S. Cl. ..... 362/206; 362/157; 362/187; 362/198; 362/207; 200/60
(58) Field of Search ..... 362/157, 158, 362/187, 198, 202, 204, 205, 206, 207; 200/60

(56) References Cited

U.S. PATENT DOCUMENTS

| | | | | | |
|---|---|---|---|---|---|
| 1,265,820 | A | * | 5/1918 | Seymour | 362/206 |
| 1,644,126 | A | * | 10/1927 | Harris | 362/205 |
| 1,823,778 | A | * | 10/1931 | Lister | 40/655 |
| 2,249,691 | A | * | 7/1941 | Gelardin | 362/206 |
| 2,347,531 | A | * | 4/1944 | Yardeny | 200/60 |
| 2,443,539 | A | * | 7/1948 | Kopp | 200/60 |
| 2,490,830 | A | | 12/1949 | Norton | 240/10.63 |
| 2,540,683 | A | * | 2/1951 | MacLean | 362/202 X |
| 3,526,765 | A | * | 9/1970 | Rossi | 362/158 |
| 3,588,423 | A | * | 6/1971 | Hallerberg | 200/302.2 |
| 3,652,846 | A | * | 3/1972 | Starck, II | 362/158 X |
| 3,924,116 | A | * | 12/1975 | Brindley | 362/158 |
| 3,982,089 | A | * | 9/1976 | Hyltin | 200/512 |
| RE29,047 | E | * | 11/1976 | Brindley | 362/205 |
| 4,114,187 | A | * | 9/1978 | Uke | 362/158 |
| 4,135,230 | A | | 1/1979 | Armbruster | 362/206 |
| 4,286,311 | A | * | 8/1981 | Maglica | 362/205 |
| D263,170 | S | * | 2/1982 | Maglica | D26/49 |
| 4,388,673 | A | * | 6/1983 | Maglica | 362/183 |
| 4,441,142 | A | * | 4/1984 | Garofalo | 362/158 |
| 4,472,766 | A | * | 9/1984 | Hung | 362/158 |
| 4,484,253 | A | * | 11/1984 | Roberts | 362/206 |
| 4,517,499 | A | * | 5/1985 | Saron | 362/206 X |
| 4,527,223 | A | * | 7/1985 | Maglica | 362/187 |
| 4,531,178 | A | * | 7/1985 | Uke | 362/158 |
| 4,577,263 | A | * | 3/1986 | Maglica | 362/187 |

FOREIGN PATENT DOCUMENTS

| | | |
|---|---|---|
| GB | 411218 | 6/1934 |
| JP | 514620 | 11/1930 |
| JP | 1419704 | 12/1939 |
| JP | 4533197 | 12/1970 |

* cited by examiner

*Primary Examiner*—Stephen F. Husar
(74) *Attorney, Agent, or Firm*—Lyon & Lyon LLP

(57) ABSTRACT

A waterproof flashlight wherein the flashlight is activated by means of a switch located in the flashlight's end cap. Another aspect of the invention being the orientation of the positive terminals of the flashlight's batteries away from the head assembly.

26 Claims, 4 Drawing Sheets

Fig. 1
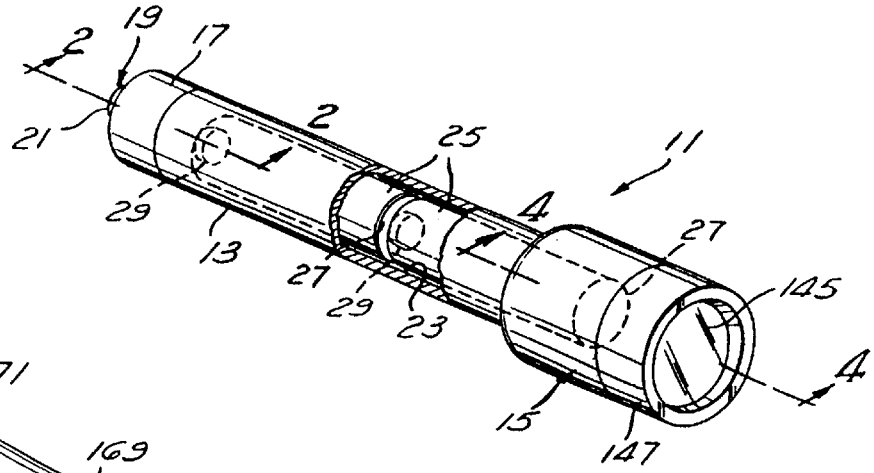
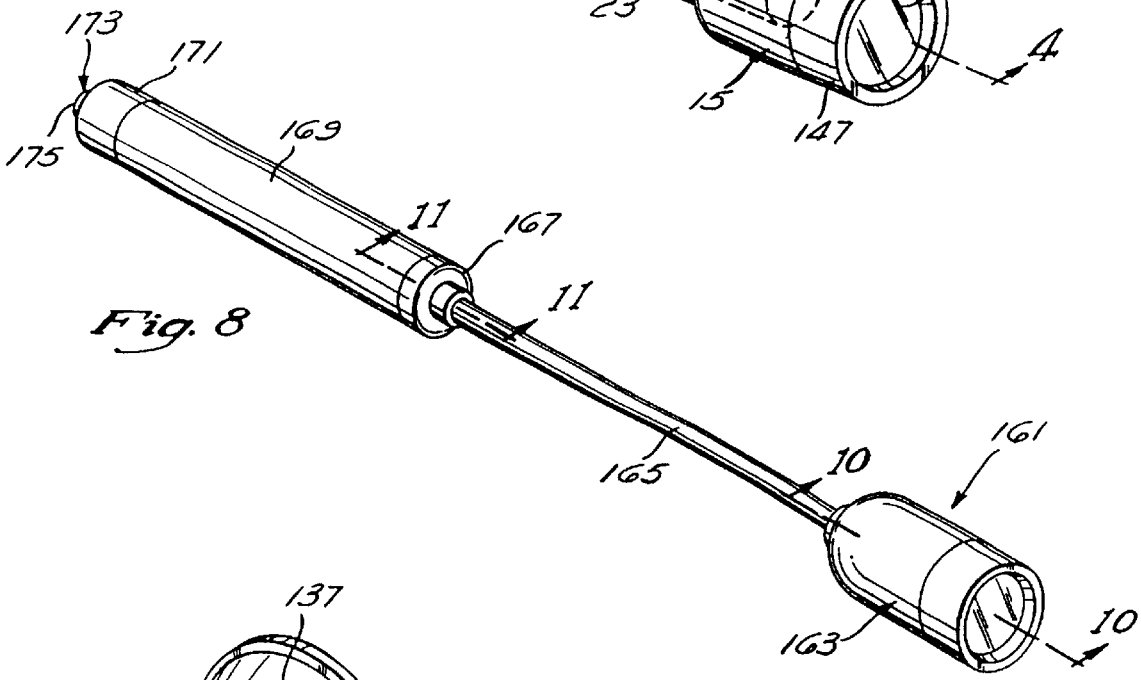
Fig. 8
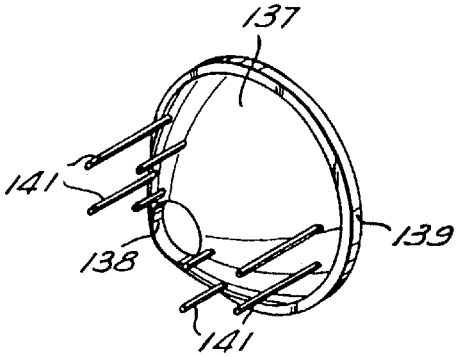
Fig. 9

MINIATURE FLASHLIGHT

Matter enclosed in heavy brackets [ ] appears in the original patent but forms no part of this reissue specification; matter printed in italics indicates the additions made by reissue.

*This application is a continuation of application Ser. No. 07/498,824, filed Mar. 22, 1990, now abandoned.*

BACKGROUND OF THE INVENTION

The present invention relates primarily to flashlights, and in particular, to miniature hand-held flashlights.

Although miniature flashlights have long been known in the art, it is only been recently, with the development of miniature flashlight lamp bulbs having superior light-emitting characteristics and with improvements in the reflective quality of in flashlight reflectors, that there has developed a genus of high quality miniature flashlights.

U.S. Pat. No. 4,577,263 issued to Maglica discloses one member of this genus. Maglica discloses a high quality, hermetically-sealed miniature flashlight having a rotating head assembly which is used to vary the relative positions of the bulb and the reflector in order to adjust the flashlight beam from broad and diffuse to narrow and concentrated. By continuing to rotate the head assembly so that it is translated towards the tail cap of the flashlight, the circuit between the bulb and the batteries is opened and the flashlight is shut off.

Due to their compact size and their superior light emitting characteristics, these high quality miniature flashlights are particularly useful in emergencies. In these situations, however, it is often the case that only one hand can be spared for operating the flashlight. Unfortunately, it is somewhat cumbersome to actuate the flashlight by rotating the head assembly with one hand. Furthermore, when the flashlight needs to be used as a flashing signal light, the rotating head assembly switch is inconvenient, even when two hands are used to operate the switch.

During a crisis, it is particularly critical that the integrity of the electrical contacts forming the flashlight's electrical circuit be maintained. Unfortunately, it is in precisely these circumstances that the flashlight is most likely to be dropped and damaged. If the flashlight is dropped, the disproportionately large percentage of the flashlight's mass located in the head assembly will give the flashlight a tendency to strike the ground head assembly first. This type of a fall will cause the flashlight's batteries to be driven against the forward wall of the battery retainer, thereby causing a disproportionately large percentage of the impact to be borne by the raised nipple of the positive terminal of the battery which rests against the front wall of the retainer. As a result of this impact force, the nipple may be crushed or dented; thereby, in view of the very small contact area of these miniature batteries, potentially interrupting the flashlight's electrical circuit.

Therefore, there is needed an improved miniature flashlight which overcomes the drawbacks of prior miniature flashlight designs, while retaining the waterproof and high quality light emitting features which have led to the widespread use of these flashlights.

SUMMARY OF THE INVENTION

The invention comprises an improved waterproof flashlight wherein the flashlight is activated by means of a switch located in the flashlight's end cap.

The flashlight includes an elongate battery retainer, a bi-pin lamp bulb holder, a bulb-battery contact adapted to electrically connect one pin of a bi-pan bulb held by the lamp holder to a terminal of a dry-cell battery in the batter retainer, a head assembly which includes a lens through which light from a bulb held by the lamp holder can be emitted, an end cap opposite the head assembly from the battery retainer, and a switch mechanism in the end cap.

The flashlight also includes means for creating a fluid-tight seal between the head assembly and means for creating a fluid-tight seal between the battery retainer, and the battery retainer and the end cap.

The switch mechanism provides the means by which the flashlight's electrical circuit can be opened and closed. The switch mechanism includes a nonconductive contact housing which defines a cavity. The switch's battery-cavity contact is adapted to electrically connect the cavity to a terminal of a battery within the battery retainer having a charge opposite to the terminal electrically connected to the bulb-battery contact of the bi-pin bulb. The switch's cavity-end cap contact is adapted to electrically connect the cavity to the other pin of a bi-pin lamp bulb retained by the lamp holder. An electrically conductive shorting member is adapted to be movable within the cavity of the contact housing so as to selectively electrically connect and disconnect the battery-cavity contact and the cavity-end cap contact to open and close the flashlight's electrical circuit.

The switch is operated by means of a plunger/button which is separated from the shorting member by means of a fluid-tight diaphragm. The switch mechanism's plunger/button is adapted to force the fluid-tight diaphragm against the shortning member and thereby to move the shorting member within the housing cavity to open or close the flashlight's electrical circuit.

Another feature of the present invention is a means of protecting the raised positive terminals of dry cell batteries in flashlights by means of orienting the positive terminals away from the flashlight's head assembly and by providing a recess in the contact housing having a depth slightly less than the height of the battery's positive terminal and a width slightly greater than the width of the battery's positive terminal so the positive terminal is retained in the recess and is thereby protected from damage by said housing.

DESCRIPTION OF THE DRAWINGS

These and other features of the invention will now be described with reference to drawings of a preferred embodiment which is intended to illustrate, and not to limit, the invention, and in which:

FIG. 1 is a partially cut-away perspective view of a miniature flashlight of the present invention;

FIG. 8 is a perspective view of an alternative embodiment of the present invention;

FIG. 9 is a perspective view of the flashlight's reflector illustrating the position of the reflector's bulb holding pins;

DETAILED DESCRIPTION OF THE PREFERRED EMBODIMENT

Figure 2:
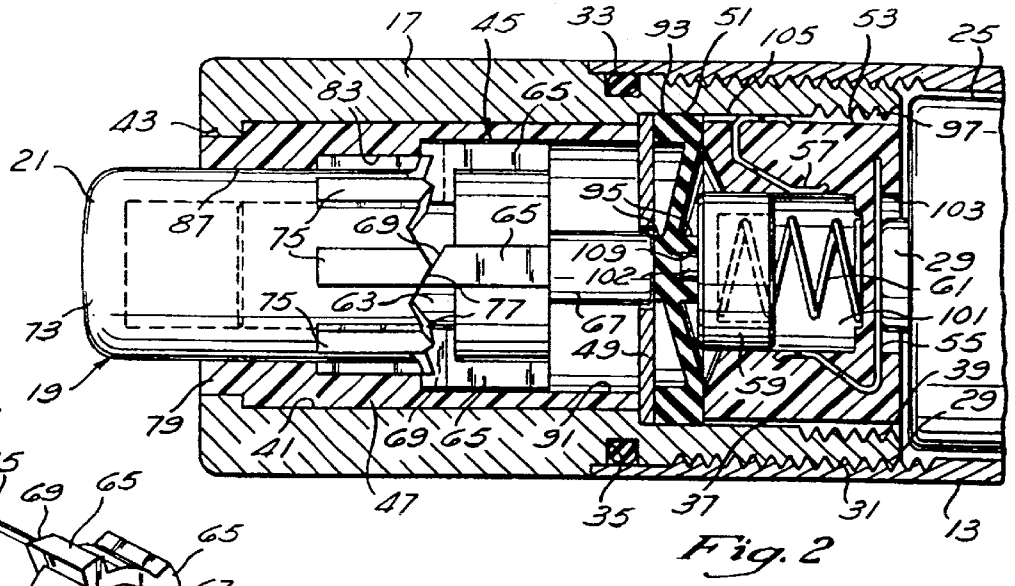
FIG. 2 is an enlarged partial sectional view taken along 2—2 of the FIG. 1 illustrating the flashlight switch mechanism.

Referring to FIG. 1, there is shown a miniature flashlight 11 having a generally cylindrical, elongate battery retainer 13, a larger diameter, generally cylindrical head assembly 15 secured to one end of the retainer 13, and a generally cylindrical end cap 17 having a diameter essentially equivalent to that of the retainer 13, secured to the opposite end of the retainer. As better shown in FIG. 2, the flashlight's electrical circuit is opened and closed by means of a switch mechanism 19 located in the end cap 17 which is operated by depressing a cup-shaped button 21.

In its preferred embodiment, the battery retainer 13 is fabricated from anodized, heat treated aluminum and the retainer defines a hollow, generally cylindrical chamber 23 for holding two AA dry-cell batteries in series.

Figures 4, 5, 6, 7:
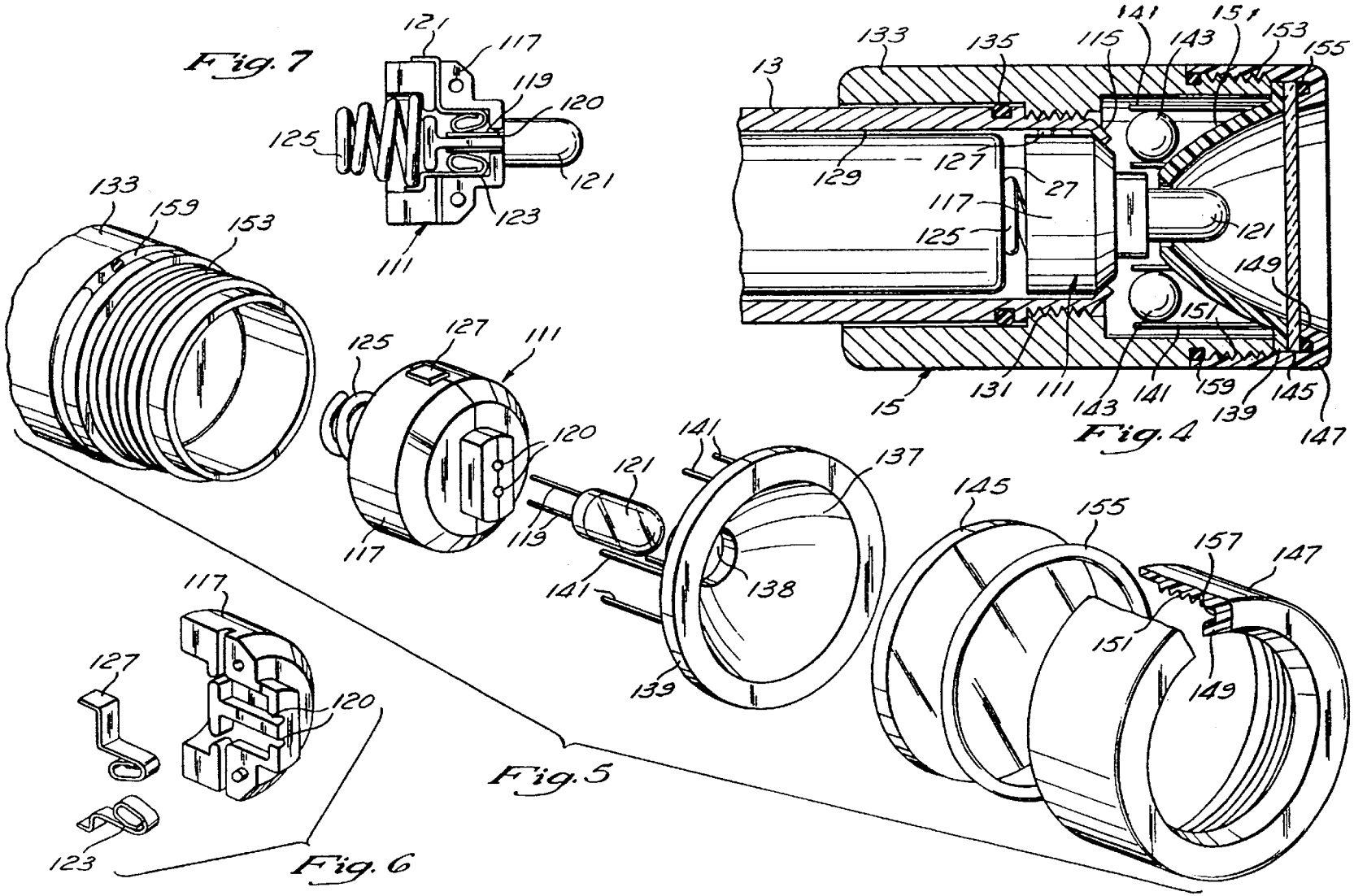
FIG. 4 is an enlarged partial sectional view taken along 4—4 of FIG. 1 illustrating the flashlight's head assembly.
FIG. 5 is an exploded perspective view of the head assembly of FIG. 4.
FIG. 6 is an exploded perspective view of the contacts and housing of the flashlight's lamp holder.
FIG. 7 is an enlarged perspective elevation view illustrating the partially assembled lamp holder of the present invention.

As shown in phantom in FIG. 1, a pair of dry cell batteries 25 are oriented so that their negative terminals 27 face the head assembly 15 and their positive terminals 29 face the end cap 17. This arrangement permits the brunt of a head assembly-first fall to be borne by the base-plate of the negative terminal 27 of the battery proximate the head assembly, rather than the fragile, raised positive terminal. Additionally, as shown in FIG. 4, a spring 28 located proximate the head assembly 15 biases the batteries 25 away from the head assembly 15 and acts as a shock absorber to cushion the batteries in the event of a head assembly first fall.

Referring to FIG. 2, the end cap 17 is secured to the retainer 13 by means of a set of internal threads 29 within the end of the retainer, which are interengageable with a set of external threads 31 located at one end of the end cap 13. The internal threads 29 of the retainer 13 are spaced slightly from the end of the retainer so as to form a small skirt portion which fits tightly over a corresponding cut-away portion of the end cap. An O-ring 33 is provided in a groove 35 in the end cap opposite the mating skirt portion ensure a fluid-tight seal between the retainer and the end cap.

The end cap 13 houses the switch mechanism 19 of the flashlight 11 in two interconnecting cylindrical chambers. A first, waterproof chamber 37 extends from the retainer roughly the length of the external threads of the end cap. A short set of internal threads 39 are provided at the mouth of the waterproof chamber. A second, longer but smaller diameter button/plunger chamber 41 extends the length of the rest of the end cap 13. A relatively thin, radially inward directed peripheral lip 43 is provided at the mouth of the button/plunger chamber opposite the retainer 13.

Figure 3:
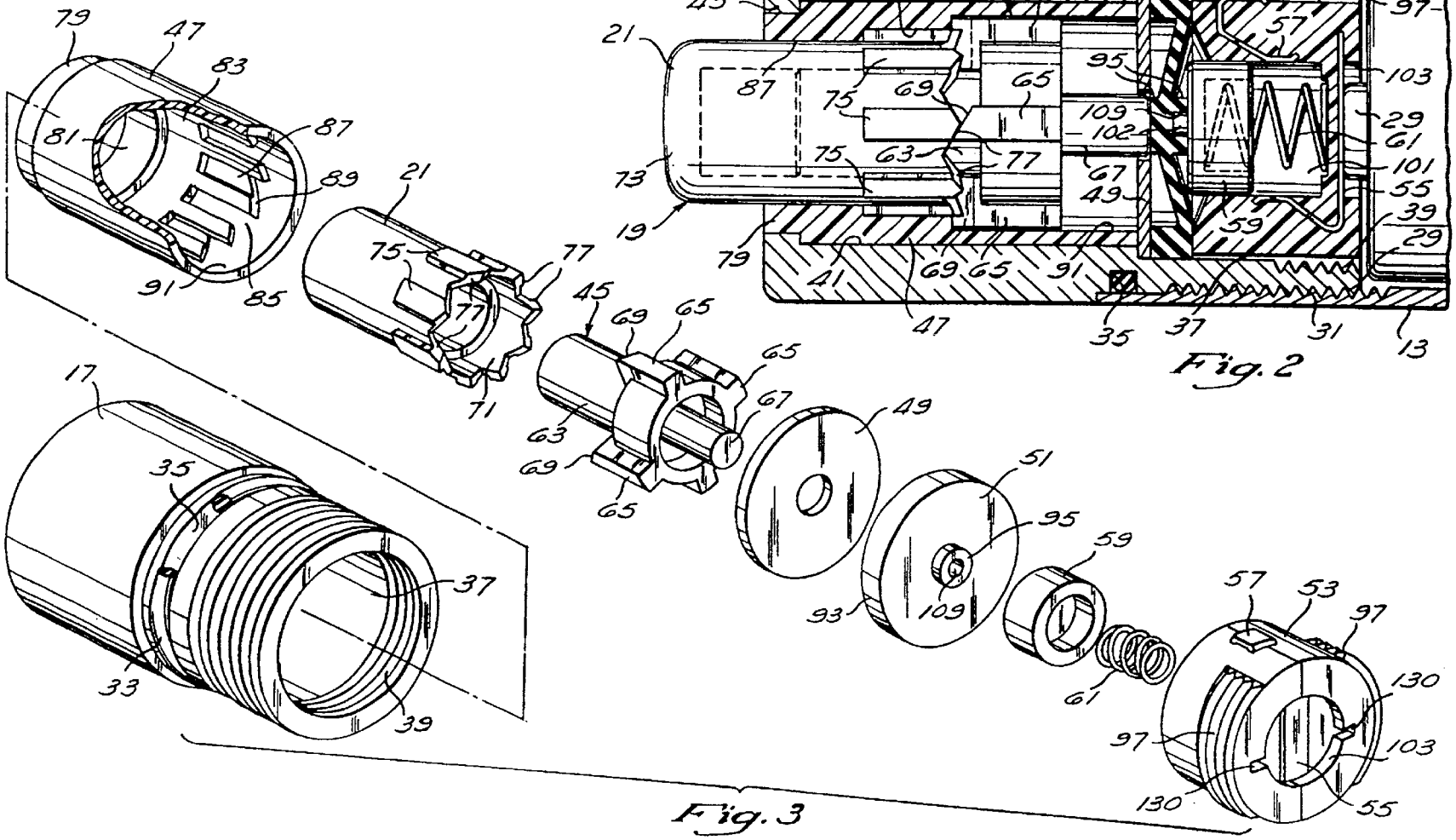
FIG. 3 is an exploded perspective view of the switch mechanism illustrated in FIG. 2.

As shown in FIGS. 2 and 3, the switch mechanism 19 includes a cup-shaped button 21, a plunger 45, a plunger cylinder 47, an annular ring 49, a diaphragm 51, a contact housing 53, a battery-cavity contact 55, a cavity-end cap contact 57, a shorting member 59, and a member-biasing spring 61. By depressing the cup-shaped button 21, the plunger 45 is driven against the diaphragm 51 to overcome the bias of the member-biasing spring 61 and cause the shorting member 59 to complete the circuit between the battery-cavity contact 55 and the cavity-end cap contact 57.

As shown in FIG. 3, the plunger 45 includes a shaft portion 63, radially outward extending ribs 65, and an actuating portion 67. As best seen in FIG. 2, the ribs 65 possess cam surfaces 69 proximate the shaft portion. The diameter of the plunger shaft is such that the shaft is freely rotatable and slideable within the open end of the cup-shaped button.

The button 21 is cup-shaped, having an open end 71 and a closed end 73. Around the open end of the button there are provided a series of radially outward extending guides 75 which also form a series of axially extending cam surfaces 77, in the form of serrated teeth, along the rim of the open end 71 of the button 21. As best seen in FIG. 2, the guides 75 are as wide as the ribs 65 of the plunger 45, but do not extend as far outward as do the ribs.

Both the button 21 and the plunger 45 are housed by a hollow plunger cylinder 47 which fits tightly within the button plunger chamber 41 and is provided with a annular detent 79 along its exterior end which mates with the end cap's peripheral lip 43. The cylinder 47 defines three chambers. A cylindrical access chamber 81 at the mouth of the end cap 17 permits the closed end of the button 21 to slide beyond the end of the end cap 17 so that force may be applied to it to operate the switch mechanism 19. Adjoining the access chamber 81 is a grooved guide chamber 83 having a diameter equal to that of the access chamber, but including grooved recesses parallel to the axis of the cylinder which are formed in the cylindrical wall of the chamber. Alternating recesses are deep recesses 85, deep enough to receive and slideably retain both the guides 75 of the button 21 and the ribs 65 of the plunger 45. In between each deep recess 85 is a shallow recess 87, deep enough to receive and slideably retain the guides 75 of the button 21, but not the ribs 65 of the plunger 45. At the top of each shallow recess 87 is a cam surface 89 which interacts with the cam surface 69 of the ribs 65 to turn the plunger 45 whenever a rib is forced against it. The third chamber is a cylindrical rotational chamber 91 having a diameter such that the ribs of the plunger are freely rotatable within it.

As shown in FIGS. 2 and 3, a rigid, flat, annular ring fits 45 tightly against the shoulder between the waterproof chamber 37 and the button/plunger 41 chamber. The ring's inner diameter is such that the actuating portion 67 of the plunger 45 is freely slideable therethrough.

A circular diaphragm 51 having an axially raised, peripheral annular lip 93 is sandwiched between the ring 49 and the contact housing 53 so that the ring and the diaphragm's annular lip 93 form a fluid tight seal. The diaphragm 51 is further provided with an axially raised cylindrical projections 95 on either side of its center point.

Referring still to FIGS. 2 and 3, the open end of a two-piece, interlocking, nonconductive contact housing 53 is secured against the diaphragm by means of external threads 97 located at the base of the housing 57 which are interengageable with the mating set of internal threads 99 of the end cap 17. The housing 53 is cup-shaped, having an open end and a closed end, wherein the open end of the housing defines a relatively large internal cylindrical cavity 101. A cylindrical recess 103, having a depth slightly less and the diameter slightly greater than the height and width, respectively, of a positive terminal 29 of the dry-cell battery in the retainer 13, is provided in the center of the closed end of the housing 53 to receive the positive terminal 29 of the battery 25.

Thus received by the recess 103, the positive terminal 29 will be protected from damage by the housing 53 in the event the flashlight is struck either from the side or from behind. When the flashlight is struck from the side, the force of the battery retainer 13 against the battery 25 will limit the movement of the battery. The diameter of the cylindrical recess 103 is such that at the limit of this sideways movement, the positive terminal 29 will not be in contact the cylindrical wall of the recess 103. If the flashlight is struck from behind, the movement of the battery 25 towards the end cap 17 will be limited by the housing 53. Although the recess 103 is of necessity shallower than the height of the positive terminal 29, the housing 53 will greatly limit the amount of structural damage inflicted upon the positive terminal 29.

As best seen in FIG. 2, a battery-cavity contact 55 connects the positive terminal 29 of a battery located within this recess 103 with the housing cavity 101. A cavity-end cap contact 57 connects the opposite side of the housing cavity 103 to the inner wall 105 of the end cap 17.

A cylindrical, electrically-conductive shorting member 59 is slideably mounted within the cylindrical cavity 101 of the contact housing and is biased towards the diaphragm 51 by a helical member-biasing spring 61. The member is provided with a raised nipple 102 adapted to mate with a detent 109 provided in the projection 95 extending from the member side of the diaphragm.

Referring to FIG. 4, a lamp holder 111 is secured within the retainer 13 by means of an inwardly-directed overhanging lip 115. As shown in FIGS. 5–7, the lamp holder 111 includes a two-piece, nonconductive pin housing 117 which forms a pair of channels 120 for receiving and frictionally retaining the pins 119 of a bi-pin flashlight lamp bulb 121. Referring now to FIG. 7, a bulb-spring contact 123 is provided within one of the channels for connecting the pin 119 in the channel to the conductive battery-biasing spring 28. The helical spring 125 electrically connects the negative terminal 27 of the battery to the pin 119 and biases the flashlight's batteries towards the end cap 17.

A bulb-retainer contact 127 is located within the other channel to electrically connect the other pin 119 of the bi-pin bulb to the interior wall 129 of the retainer 13.

The use of a two-piece, nonconductive pin housing 117 and a two-piece, nonconductive contact housing 53 facilitates the process of manufacturing, assembling and replacing the lamp holder and switch mechanism. The two piece housing can be injection molded and the contacts can be fabricated separately, thereby minimizing the difficulty of manufacturing the parts. Assembly is facilitated in that the contacts are easily snapped into their respective channels and the two pieces of the housings are easily aligned due to their mating posts and notches. Furthermore, replacement of the contacts is facilitated in that it is relatively simple to pull the housings apart and slip in new contacts. To facilitate the installation and removal of the contact housing 53, two notches 130 are provided on either side of the recess to permit a screw driver to be used to screw the housing 53 in or out.

Referring still to FIGS. 4 and 5, the head assembly 15 is secured to the retainer 13 by means of interengaging threads 131 located on the exterior of the retainer and the interior of a head casing 133, respectively. An O-ring 135 is provided within an annular groove between the casing 133 and the retainer 13 below the base of the interengaging threads 131 to form a water-tight seal between the casing and the retainer.

The head assembly 15 further includes a substantially parabolic reflector 137 having an opening 138 at its apex through which the head of a bi-pin lamp 121 is loosely slideable. A radially outward directed, annular lip 139 having a diameter slightly larger than the internal diameter of the head casing 133, aligns the reflector with the head casing. As best seen in FIGS. 4 and 9, a series of pins 141 spaced along the convex edge of the reflector 137 and substantially parallel to the axis of the reflector receive and retain bi-pin lamp bulbs 143 providing a means of carrying replacement lamp bulbs in the head assembly 15.

The flashlight emits light through a generally circular, transparent, planar lens 145, having a diameter essentially equal to the outer diameter of the reflector's annular lip 139. A head cap 147 holds the lens 145 in place against the lip 139 of the reflector. The head cap 147 generally has the shape of an annular ring, but is provided with a L-shaped inner, annular lip 149 at one end. The cap 147 is further provided with internal threads 151 which are interengageable with external threads 153 on the casing. An o-ring 155 is fitted within the annular groove 157 formed by the lip and the cap, in order to form a fluid-tight seal with the lens 145 and to force the lens tightly against the reflector 137 and the reflector tightly against the casing 133. Another o-ring 159 is fitted between the head cap 147 and the casing 133 proximate the base of the interengaging threads 151 to create a fluid-tight seal between the cap and the casing.

The operation of the flashlight will now be briefly described. When the flashlight is off, the switch mechanism 19 will be in the position shown in FIG. 2. That is, the shorting member 59 will not contact either the battery-cavity contact 55 or the cavity-end cap contact 57 and the ribs 65 of the plunger 45 will be retained by the deep recesses 85 of the cylinders.

If it is desired to use the flashlight as a flashing light, it is necessary only that the button 21 be pressed lightly so that the button drives the plunger 45 against the diaphragm 51 and the diaphragm against the shorting member 59 so that the force of the member-biasing spring 61 will be overcome and the member 59 will touch both of the contacts, 55 and 57. So long as the button 21 is not depressed so far that the cam surfaces 69 of the ribs 65 extend above the deep recesses 85 of the cylinder 47, the ribs of the plunger will be slideably retained by the recesses and the plunger will be prevented from rotating. Thus, when the button is released, the member-biasing spring 61 will force the member 59 against the diaphragm 51 and the diaphragm against the plunger 45, causing the member to slide away from the spring, out of contact with the battery-cavity contact 55 and the cavity-end cap contact 57 to break the flashlight's electrical circuit. The pressure on the plunger will cause the plunger to return to its original position within the deep recess 85. By alternatively pressing and releasing the button in this manner, the desired flashing signal may be obtained.

If it is desired to turn on the light for a more extended period of time, it is merely necessary to press the button 21 so that it is even with the base of the end cap 17. When the cam surfaces 69 of the ribs 45 slide beyond the ends of the deep recesses 85, the combination of the force applied on the button by the operator and the force of the member-biasing spring 61 will cause the cam surfaces of the button and the ribs to slide against one another causing the plunger to rotate so that the cam surfaces of the ribs rest the between the cam surfaces 77 of the button. When the button is released, the member-biasing spring will push the member towards the plunger, causing the diaphragm to push the plunger back within the cylinder. Since the button's guides 75 are short enough to fit in the shallow recesses 87, the button will again slide back within the guide grooves, however, the taller cam surfaces 69 of the ribs 65 will be prevented from sliding into the shallow recesses 87 and will be forced against the cam surfaces 89 of the cylinder 47 by the spring 61. This will cause the cam surfaces of the cylinder and the ribs to slide against one another, causing the plunger 45 to rotate further and become lodged against the side of the cylinder. In this position, the member 59 will remain in contact with the battery-cavity contact 55 and the cavity-end cap contact 57 and the flashlight's circuit will remain closed.

If the button is again fully depressed, the combination of the force on the button 21 and the force of the member-biasing spring on the cam surfaces of the plunger 45 will again cause the plunger to rotate so that the cam surfaces of the ribs rest between the cam surfaces 77 of the button 21. However, when the button is released, the ribs will be able to slide freely within the deep recesses 85 of the cylinder, pushing the button outward and permitting the shorting member 59 to break contact with the battery-cavity contact 55 and the cavityend cap contact 57, thereby opening the flashlight's electrical circuit.

Referring to FIG. 4, the flashlight's beam may be adjusted by means of rotating the head assembly 15 relative the battery retainer 13 clockwise or counterclockwise along the interengaging threads 131. This rotation has the effect of changing the relative position of the reflector 137 and the bi-pin lamp 121 held by the holder 111.

Thus, the present invention provides a waterproof miniature flashlight having an adjustable beam which is readily operable with one hand and as flashing light. Additionally, since the adjustment of the flashlight's beam is independent of the switch mechanism, there is no need to re-focus the flashlight beam after each time the flashlight's electrical circuit is opened and closed.

FIG. 8 illustrates an alternative embodiment of the present invention. The waterproof flashlight 161 incorporates a head assembly 163, a flexible neck 165, a retainer cap 167, an elongated battery retainer 169, an end cap 171 and a switch mechanism 173. The switch mechanism is operated by means of pressing or releasing a button 175 which projects from the end of the end cap 171.

In the preferred embodiment, the flexible neck flashlight 161 incorporates a generally cylindrical, elongated battery retainer 169 fabricated from anodized heat-treated aluminum which defines a generally cylindrical chamber for holding two AA dry-cell batteries in series. The batteries are preferably oriented so that their negative terminals face the retainer cap and their positive terminals face the end cap.

The flexible neck flashlight's end cap 171 and switch mechanism 173 are identical to the end cap 17 and switch mechanism 19 of the standard miniature flashlight described above, and therefore the details of their construction will not be repeated here.

Figure 10:
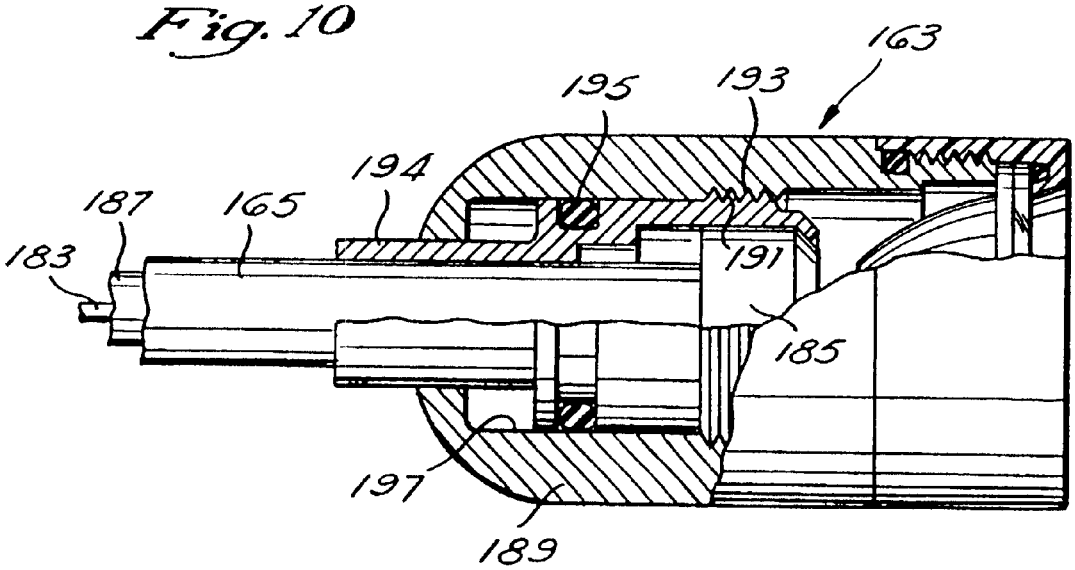
FIG. 10 is an enlarged partial sectional view taken along 10—10 of FIG. 8 illustrating the head assembly of the flashlight.
Figure 11:
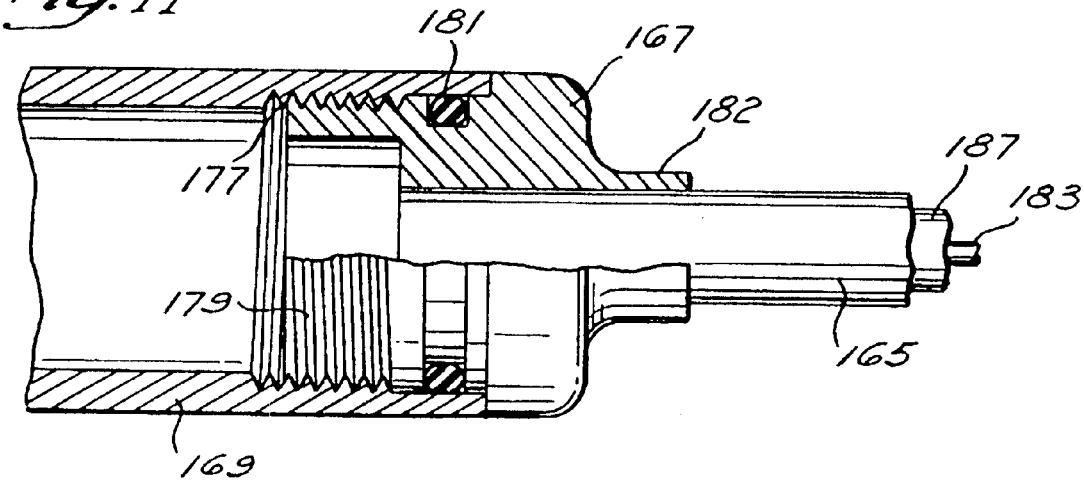
FIG. 11 is an enlarged partial sectional view taken along 11—11 of FIG. 8 illustrating the retainer cap of the flashlight of FIG. 8.

Referring to FIGS. 10 and 11, since the end of the battery retainer 169 opposite the end cap 171 is not designed to mate directly with the head assembly 163, it is provided with internal threads 177 spaced slightly from the end of the battery retainer. These internal threads 177 are interengageable with a set of external threads 179 on the retainer cap 167. An o-ring 181 in a recessed annular groove proximate the external threads 179 of the retainer cap 169 forms a fluid-tight seal with the internal wall of the battery retainer. Likewise, the cylindrical lip 182 of the retainer cap is sealed to the exterior of the neck 165 with adhesive in order to form a fluid-tight seal.

A helical spring (not shown) extends from the end of the retainer cap 167 to electrically connect the negative terminal of a battery within the battery retainer to a spring-bulb contact 183. The spring-bulb contact extends through the neck 165 of the flashlight and electrically connects the spring to a pin of a lamp bulb held by a lamp holder 185. A retainer-bulb contact 187 extends through the neck 165 and electrically connects the internal wall of the battery retainer 169 to another pin of a bi-pin lamp held by lamp holder.

The neck 165 is made of coaxial cable having a large center conductor core to provide stiffness.

The head assembly 163 includes a generally parabolic head casing 189 which defines an internal chamber slightly larger in diameter than the lamp holder. The head casing 189 is provided with internal threads 191 which are interengageable with external threads 193 around the lamp holder which secures the casing in place. The lamp holder's protruding cylindrical lip 194 is sealed to the exterior of the neck 165 with adhesive in order to form a fluid-tight seal. The lamp holder is further provided with an o-ring 195 in a recessed annular groove which mates with the wall 197 of the interior chamber of the head casing 189 to form a fluid-tight seal between the head casing and the lamp holder.

In other respects, the head assembly 163 is identical to that of the head assembly 15 of the embodiment standard miniature flashlight described above and therefore, the details of its construction will not be repeated here.

This alternative embodiment of the present invention provides a high quality, flexible neck, waterproof flashlight having a beam which is adjustable by means of rotating head assembly relative to neck.

What is claimed is:

1. A flashlight, comprising:

a lamp bulb holder;

a head assembly, said assembly including a lens through which light from a bulb held by said lamp holder can be emitted;

an elongated battery retainer for retaining one or more dry cell batteries in series, each of said batteries having a positively and a negatively charged terminal, said positively charged terminal oriented away from said head assembly;

a spring to bias said batteries away from said head assembly;

an end cap opposite said assembly from said battery retainer; and a switch mechanism in said end cap including a nonconductive contact housing, said housing including a recess having a depth slightly less than the height of said positively charged terminal and a width slightly greater than the width of said positively charged terminal, said positive terminal being received by said recess and being protected from damage by said housing.

2. The flashlight of claim 1 wherein said housing comprises two interlocking pieces.

3. A waterproof flashlight, comprising:

an elongate battery retainer for retaining one or more dry cell batteries in series, each of said batteries having a positively and a negatively charged terminal;

a bi-pin lamp bulb holder;

a bulb-battery contact adapted to electrically connect one pin of a bi-pin bulb held by said holder to one of said terminals of a dry cell battery retained by said battery retainer;

a head assembly, said assembly including a lens through which light from a bulb held by said lamp holder can be emitted;

means for creating a fluid-tight seal between said assembly and said battery retainer;

an end cap opposite said assembly from said battery retainer;

means for creating a fluid-tight seal between said end cap and said battery retainer;

means to electrically connect said end cap to the other pin of a bi-pin lamp held by said lamp holder; and a switch mechanism in said end cap, said mechanism comprising:

a nonconductive contact housing which defines a cavity;

a battery-cavity contact adapted to electrically connect said cavity to a terminal of a dry-cell battery retained by said retainer having a charge opposite to said terminal electrically connected by said bulb-battery contact to said bi-pin bulb;

a means-cavity contact adapted to electrically connect said other pin connecting means to said housing cavity;

an electrically conductive shorting member adapted to be movable within said cavity of said housing so as to selectively electrically connect and disconnect said battery-cavity and said means-cavity contacts;

a plunger/button;

a fluid-tight diaphragm separating said plunger and said shorting member, said plunger adapted to force said diaphragm against said shorting member in order to move said member in said cavity.

4. A waterproof flashlight of claim 3, further comprising one or more dry-cell batteries retained by said battery retainer, said batteries having positive terminals oriented away from said head assembly.

5. The flashlight of claim 4, wherein said contact housing includes a recess having a depth slightly less than the height of said positive terminals of said batteries and a width slightly greater than the width of said positive terminals of said batteries, one of said positive terminals being received by said recess and being protected from damage by said housing.

6. The flashlight of claim 5, wherein said contact housing comprises two interlocking pieces.

7. The flashlight of claim 6, further comprising a reflector within said head assembly and means to adjust the relative position of said reflector and a bi-pin lamp bulb held by said holder to adjust a beam of light emitted by said flashlight.

8. The flashlight of claim 7, further comprising a flexible neck between said head assembly and said retainer to permit the position of said head assembly to be varied independently of said retainer.

9. The flashlight of claim 3, wherein said contact housing is comprised of two interlocking pieces.

10. The flashlight of claim 9, further comprising a reflector within said head assembly and means to adjust the relative position of said reflector and a bi-pin lamp bulb held by said holder to adjust a beam of light emitted by said flashlight.

11. A flashlight of claim 10, further comprising a flexible neck between said retainer and said head assembly to permit the position of said head assembly to be varied independently of said retainer.

12. The flashlight of claim 3, wherein said contact housing comprises two interlocking pieces.

13. The flashlight of claim 3, further comprising a reflector within said head assembly and means to adjust the relative position between said reflector and a bi-pin lamp bulb held by said holder to adjust a beam of light emitted by said flashlight.

14. The flashlight of claim 3, further comprising an adjustable neck between said head assembly and said retainer to permit the position of said head assembly to be varied independently of said retainer.

15. A waterproof flashlight, comprising:

a generally cylindrical elongate anodized conductive battery retainer including a hollow generally cylindrical chamber for holding one or more dry cell batteries in series, said retainer including a radially inwardly directed lip along one end, a set of external threads proximate said lip, an o-ring within an annular groove opposite said lip from and proximate to said external threads, and a set of internal threads within the other end of said retainer;

a lamp holder, said holder including a two-piece nonconductive pin housing containing a pair of channels for receiving the pins of a bi-pin lamp bulb, a bulb-spring contact within one of said channels for connecting one of said pins to a conductive battery-biasing spring which is adapted to electrically connect the negative terminal of the one of the batteries retained by said retainer and bias said batteries away from said lamp holder, and a bulb-retainer contact within the other of said channels for connecting another of said pins to said retainer;

a generally cylindrical head assembly, said assembly comprising:

a head casing, said casing including external threads at one end, a bore through said casing slightly larger in diameter than the exterior diameter of said retainer, and internal threads within said bore, said threads being interengageable with said exterior threads of said retainer;

a substantially parabolic reflector having an opening at its apex through which the head of a bi-pin lamp bulb is loosely slideable, a generally radially outward directed annular lip having an outer diameter larger than said bore and smaller than said external threads of said casing, and a series of pins spaced along the convex edge of said reflector and substantially parallel to the axis of said reflector for receiving and retaining spare bi-pin lamp bulbs;

a generally circular planar lens through which light can be emitted from a bi-pin lamp in said holder said lens having a diameter essentially equal to said outer diameter of said annular lip; and a head cap including a bore through said head cap, internal threads at one end, said internal threads being interengageable with said external threads of said casing, a generally L-shaped inner annular lip at the other end, the space between said lip and said bore forming an annular groove;

an o-ring in said annular groove for forming a fluid-tight seal with the outer edge of the circular surface of said lens and forcing said lens tightly against said reflector and said reflector tightly against said casing;

an end cap, said end cap defining a waterproof chamber and a button/plunger chamber;

an o-ring within said annular groove in said end cap for forming a fluid-tight seal with said retainer;

a switch mechanism for selectively opening and closing the electrical circuit of said flashlight, comprising:

a plunger, said plunger including a shaft portion, radially outward extending ribs includes cam surfaces proximate said shaft portion, and an actuating portion;

a cup-shaped button upon which force may be applied to operate said mechanism, having an open end within which said shaft portion of said plunger is rotatable and slideable, and radially outward extending guides, said guides forming a series of axially extending cam surfaces along the rim of said open end for interacting with said cam surfaces of said plunger to rotate said plunger;

a plunger cylinder which fits within said plunger/button chamber and within which said button and plunger are slideable, said cylinder defining three chambers; an access chamber at the mouth of said end cap which permits said closed and of said button to slide beyond the end of said end cap; a grooved guide chamber having grooves for receiving and slideably retaining said guides and cam surfaces for interacting with said cam surfaces of said ribs to rotate said plunger, and a rotational chamber within which said ribs of said plunger are freely rotatable;

a flat annular ring which fits tightly against the shoulder between said waterproof chamber and said plunger/button chamber and has an inner diameter such that said actuating portion of said plunger is freely slideable therethrough;

a circular diaphragm having an axially-raised annular lip and a axially raised axial cylindrical projection;

a two-piece, cup-shaped, interlocking, nonconductive contact housing, said housing defining a cavity and including external threads at one end for interengaging said internal threads of said end cap, cylindrical recess opposite the interior of said housing having a depth slightly less and a diameter slightly greater than the height and width, respectively, of a positive terminal of a dry cell battery in said retainer;

a battery-cavity contact adapted to connect the positive terminal of a battery located within said recess of said switch contact housing to said cavity;

a cavity-end cap contact adapted to connect said cavity to the interior wall of said end cap; and a cylindrical, electrically conductive shorting member slideably mounted within said cavity to selectively electrically connect and disconnect said battery-cavity contact and said cavity-end cap contact;

a member-biasing spring within said cavity adapted to bias said member against said diaphragm.

*16. A flashlight comprising:*

*a elongate battery retainer for retaining at least one dry cell battery therein;*

*a head assembly rotatably disposed external to one end of the retainer and containing a lens, a reflector and a lens bulb;*

*an end cap disposed proximate the opposite end of said retainer from said head assembly and defining a chamber therein;*

*circuit means for electrically coupling a first contact of the lamp bulb to a first battery electrode and a second contact of the lamp bulb to a second battery electrode;*

*a switch mechanism disposed in said end cap for selectively opening and closing said circuit means within said end cap, said mechanism comprising:*

*a plunger including a shaft portion, radially outward extending ribs including cam surfaces proximate said shaft portion, and an actuating portion;*

*an actuating member upon which force may be applied to operate said mechanism, having an open end within which said shaft portion of said plunger is rotatable and axially slideable, and radially outward extending guides, said guides forming a series of axially extending cam surfaces along the rim of said open end for interacting with said cam surfaces of said plunger to rotate said plunger;*

*a plunger cylinder which fits within said chamber in said end cap and within which said actuating member and said plunger are axially slideable and from which said actuating portion of said plunger projects, said cylinder defining a grooved guide chamber having grooves for receiving and slidably retaining said guides and cam surfaces for interacting with the cam surfaces of said ribs to rotate said plunger and alternately dispose said plunger in a retracted or extended position with respect to said cylinder;*

*an electrical contact member disposed within said end cap and axially movable therein between a first position and a second position in response to axial sliding movement of said plunger to open and close said circuit means; and*

*a spring member for biasing said contact member toward said first position.*

*17. The flashlight of claim 16 wherein rotational movement of the head assembly with respect to the retainer varies the relative positional relationship between the reflector and the lamp bulb when said lamp bulb is energized thereby providing an adjustable focus of light emission from the flashlight lens independent of said switch mechanism.*

*18. The flashlights of claims 16 or 17 wherein the dry cell battery is retained in a fixed disposition within said battery retainer.*

*19. A flashlight, comprising:*

*an elongate battery retainer for retaining at least one dry cell battery therein;*

*a head assembly rotatably disposed external to one end of the retainer and containing a lens, a reflector and lamp bulb;*

*an end cap disposed proximate the opposite end of said retainer from said head assembly and defining a chamber therein;*

*circuit means for electrically coupling a first contact of the lamp bulb to a first battery electrode and a second contact of the lamp bulb to a second battery electrode; and*

*a switch mechanism disposed in said end cap for selectively opening and closing said circuit means, said mechanism comprising:*

*a cylindrical member disposed within said chamber in said end cap;*

*an actuating member slidably mounted within said cylindrical member;*

*a plunger slidably mounted within said cylindrical member adjacent said actuating member and including an actuating portion projecting from said cylindrical member;*

*means defined by said cylindrical member, actuating member and said plunger for alternately projecting and retracting said actuating portion of said plunger with respect to said cylindrical member upon an axial force being applied to said actuating member;*

*an electrical contact member axially movable within said end caps between a first position and a second position in response to axial sliding movement of said plunger to open and close said circuit means; and*

*a spring member for biasing said contact member to said first position.*

*20. The flashlight of claim 19 wherein rotational movement of the head assembly with respect to the retainer varies the relative positional relationship between the reflector and the lamp bulb when said lamp bulb is energized thereby providing an adjustable focus of light emission from the flashlight lens independent of said switch mechanism.*

*21. The flashlight of claims 19 or 20 wherein the dry cell battery is retained in a fixed disposition within said battery retainer.*

*22. A flashlight comprising:*

*an elongate battery retainer for retaining at least one dry cell battery therein;*

*a head assembly rotatably disposed external to one end of the retainer and containing a lens, a reflector and lamp bulb;*

*an end cap disposed proximate the opposite end of said retainer from said head assembly;*

*circuit means for electrically coupling a first contact of the lamp bulb to a first battery electrode and a second contact of the lamp bulb to a second battery electrode;*

*a switch mechanism in said end cap for selectively opening and closing said circuit means within said end cap, said mechanism including a plunger adapted for axial reciprocal movement within said end cap, an actuating member for moving said plunger, a contact member mounted for axial reciprocal movement within said end cap between a first position and a second position in response to axial movement of said plunger to open and close said circuit means, and a spring member for biasing said contact toward said first position; and*

*wherein rotational movement of the head assembly with respect to the retainer varies a relative positional relationship between the reflector and the lamp bulb when said lamp bulb is energized thereby providing an adjustable focus of light emission from a flashlight lens independent of said switch mechanism.*

*23. The flashlight of claim 22 wherein said dry cell battery is retained in a fixed disposition within said battery retainer.*

*24. A flashlight comprising:*

*an elongate battery retainer for retaining at least one dry cell battery therein;*

*a head assembly rotatably disposed external to one end of the retainer and containing a lens, a reflector and a lamp bulb;*

*means for electrically coupling a first electrode of a battery to a first contact of the lamp bulb;*

*means including said elongate battery retainer for electrically coupling a second electrode of a battery to a second contact of the lamp bulb;*

*an end cap switch assembly disposed proximate the opposite end of said retainer from said head assembly, said switch assembly including a contact adapted to be moved toward and away from said head assembly between a first position and a second position, independently of said head assembly, in response to movement of at least a portion of the switch assembly with respect to the battery retainer for selectively closing an opening one of the electrically coupling means to energize and deenergize the lamp bulb; and*

*wherein rotational movement of the head assembly with respect to the retainer varies the relative positional relationship between the reflector and the lamp bulb when said lamp bulb is energized thereby providing an adjustable focus of light emission from the flashlight lens independent of the end cap switch assembly.*

*25. The flashlight of claim 24 wherein said end cap switch assembly includes a spring member for biasing said contact from electrical communication with one of the electrodes of the battery.*

*26. A flashlight having a flashlight circuit comprising:*

*a elongate battery retainer for retaining at least one dry cell battery therein;*

*a lamp bulb;*

*a first contact member for electrically coupling a first electrode of a battery to a first contact of said bulb;*

*an end cap disposed adjacent one end of said retainer;*

*a second contact member adapted for electrical contact with a second electrode of said battery;*

*a switch within said end cap for electrically coupling said second contact member to a second contact of said bulb;*

*a head assembly rotatably disposed external to a second end of said retainer and containing a lens, a reflector and said lamp bulb, wherein rotational movement of the head assembly with respect to the retainer varies the relative positional relationship between said reflector and said lamp bulb.*

* * * * *